March 18, 1941.                H. LENTZ                  2,235,223
  VALVE DISTRIBUTION FOR PISTON STEAM ENGINES, ESPECIALLY LOCOMOTIVE
    STEAM ENGINES AND THE LIKE WITH REVOLVING REVERSING SHAFTS
               Filed June 23, 1937        11 Sheets-Sheet 1

Inventor:
Hugo Lentz
BY
Bryant & Lowry
ATTORNEYS

Inventor:
Hugo Lentz
BY
ATTORNEYS

Inventor:
Hugo Lentz

Inventor:
Hugo Lentz

Patented Mar. 18, 1941

2,235,223

UNITED STATES PATENT OFFICE 2,235,223

VALVE DISTRIBUTION FOR PISTON STEAM ENGINES, ESPECIALLY LOCOMOTIVE STEAM ENGINES AND THE LIKE WITH REVOLVING REVERSING SHAFTS

Hugo Lentz, Berlin, Germany

Application June 23, 1937, Serial No. 150,000
In Germany June 26, 1936

5 Claims. (Cl. 121—167)

This invention relates to a poppet valve gear for piston steam engines especially for locomotives and marine engines, in which the admission and exhaust valves are actuated by rotatable axially shiftable control cams.

In the known poppet valve gears of this type the lifting surfaces of the admission cams rise to the same height throughout along their entire axial length with generating lines parallel to the axis of rotation in order to then descend in a helical line for setting the different charges. By the axial displacement of the cams the charge and consequently the output of the engine can be changed. This construction of the cams is, however, open to the objection that they and the elements actuated thereby are subjected to heavy wear because the control cams have only point contact with the elements they drive. This objection can only be overcome to a certain extent by gentle ascending lifting surfaces, apart from the fact that it results in sluggish that is too slow opening of the valves.

It has already been proposed to construct the rotary driving cams of poppet valve gears in step shape, by providing several lifting surfaces with generating lines parallel to the axis of rotation and on which lifting rollers run, these lifting surfaces being connected by approximately cone shaped inclined surfaces. The individual lifting surfaces and the rollers running thereon can, however, only be of very narrow width. Apart from this the total length of the control cams will be very great and consequently considerable displacements of the cams are necessary especially when reversing the engine. As regards wear only slight advantages are derived and moreover on a small number of different charges can be adjusted. Furthermore no continuous changing of the charges is possible and when changing over from one charge to another the element driven by the control cam must be lifted off.

The present invention relates to a poppet valve gear with rotary control cams by which not only the above mentioned objection of the known gears are avoided but an extensive adaptation of the cams to the normal or continuous service of the engine is attained. The invention is based on the knowledge that piston steam engines which serve for driving locomotives, ships or the like operate during the greater part of their service with a certain minimum or normal charge, whereas larger charges are only set by way of exception for example when starting up, maneuvering and so forth.

Consequently the admission valve according to the invention has two different parts. One part, whose lifting and lowering surfaces have generating lines extending parallel to the axis of rotation, is intended for driving the locomotive on level stretches and for the cruising speeds in the case of ships. For this part the charge is so chosen that during this by far the longest working period the most favourable engine output is obtained, that is during this entire working period the control parts run on and off with full line contact.

The second part of the control cam which is intended for the other charges, is only used when starting up, maneuvering and on up gradients. Consequently it is only stressed occasionally and for short periods, but also in this case the control element runs on with full line contact until the valve is completely open and retains line contact up to the running off.

The invention also relates to another construction of such a cam controlled valve gear.

The construction of the new rotating control cams is illustrated in Figs. 1 to 9, whereas the Figs. 10 to 25 illustrate the application of this kind of distribution on locomotives with different valve arrangement and different constructions of the reversal.

Figs. 5 and 5a show the intermediate lever in section on line V—V of Figs. 4 and 4a.

Figure 1:
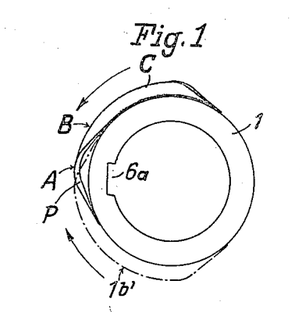
Fig. 1 shows the admission control cam in side elevation.

The chief characteristic feature of the present invention consists in the special construction of the rotary control cams and of the intermediate levers cooperating with the same. The admission control cam 1 consists of two juxtaposed elements 1a and 1b. The inner element is destined for the smallest admission at which the engine runs, for instance 10%. Its whole control face A is formed by generating lines situated parallel to the axis of rotation on which an intermediate lever 2 of similar width runs. The control face A of this element ascends first up to complete valve lifting, maintains the valve open and descends then.

The element 1a is continued by the second element 1b which is destined for the other admissions up to 80%. The control face B of this element ascends first in similar manner and to the same height as the control face A of element 1a and extends then cylindrically. The cylinder face merges on the inner side into a helically extending running off face C.

When the first element of the control cam moves under the intermediate lever it bears on its whole width with line contact on the control face up to the complete lifting of the valve, i. e. just when by the acceleration of the valve the highest back pressure exists. This line contact remains during the admission period and also during the closing period the intermediate lever being held in contact with the control cam under the influence of the low closing pressure of the valve.

If the cam is adjusted to larger admission the opening of the valve up to complete height takes place also under the same favorable conditions, with the difference that during the closing of the valve the inclined face of the intermediate lever runs off on the inclined running off face C of the second element of the control cam with line contact.

Figure 6:
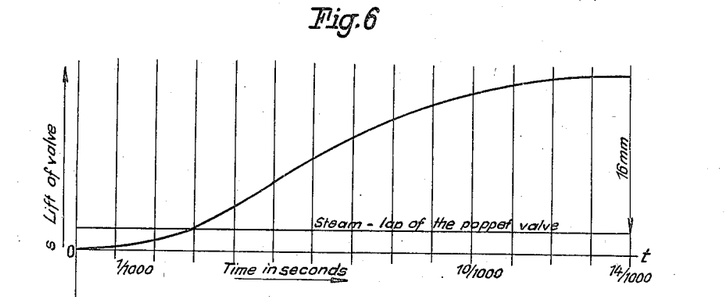
Fig. 6 shows the curve of the valve lifting.
Figure 7:
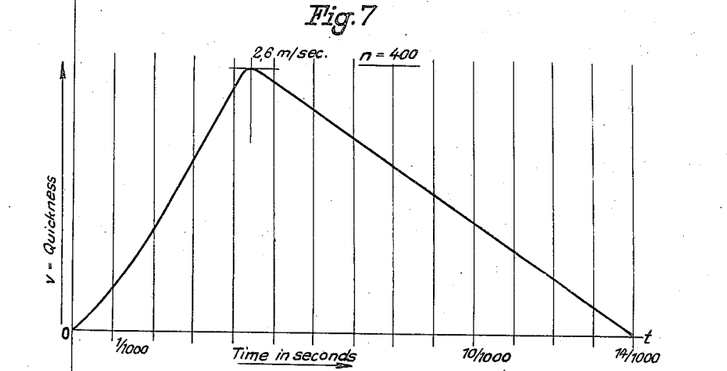
Fig. 7 the curve of the speed.
Figure 8:
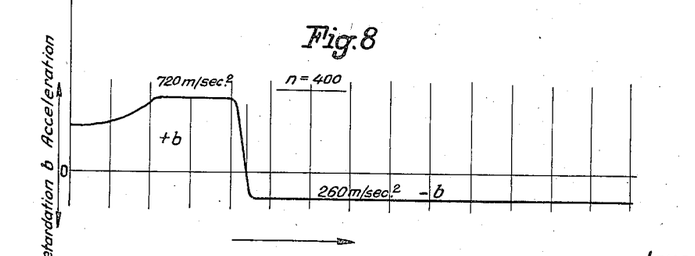
Fig. 8 the curve of the acceleration or retardation of the valve.

The shape of the control cam and its rounded portions are here selected so that the lifting of the valve is quite gradually effected and carried out in arc shape (Fig. 6). This means a steadiness of the speed curve (Fig. 7) and therefore a uniform acceleration (Fig. 8), which is determined by the curvature of the operative faces of the intermediate lever at straight running on of the cam. The acceleration has thus been increased to an admissible maximum value and its apex, which occurs in the usual cam shapes, is avoided owing to the correct selection of the lever curvature and cam rounding. The permissible maximum value remains constant during the acceleration period and does not cause any shocks and excessive wear.

The retardation has become, by the continuous arc-shape of the ascending curve and the steady reduction of the speed attained thereby, quite as steady and is the reason for the uniform low closing pressure for the valves by steam.

Figure 2:
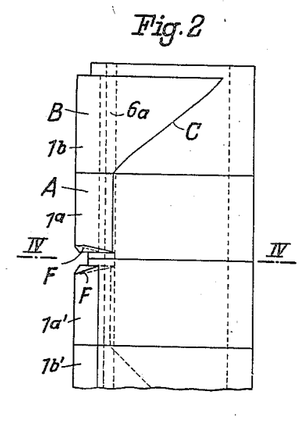
Fig. 2 shows the admission cams for forward movement and backward movement (the latter only partly) in top plan view.
Figure 3:
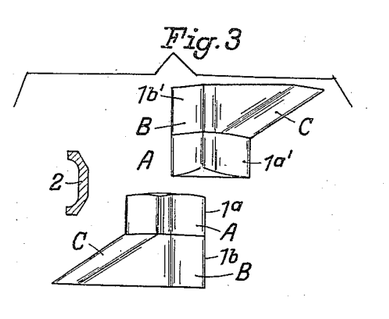
Fig. 3 shows a development of the admission cam into a plane, the cross-section of the intermediate lever cooperating with the control cam being indicated.

By this subdivision of the admission cam its manufacturing is considerably simplified. The same control cam can also be employed for backward running, as the second control cam destined for the backward run need merely be placed, as Fig. 2 shows, in opposite direction on the same key 6a of the cam shaft 6.

Figure 4:
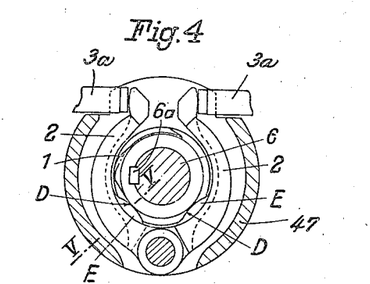
Fig. 4 is a section on line IV—IV of Fig. 2 with the intermediate levers acting upon the ends of the valve spindles omitted in Fig. 2.
Figure 5:
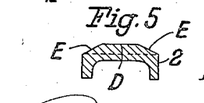

The intermediate lever 2 cooperates with these control cams and has a protruding operative face D and at either side of the same feebly inclined faces E (Figs. 4 and 5). The operative faces of the two intermediate levers 2 touch the control cam at points which are mutually displaced by 90° in accordance with the driving cranks.

During the lifting of the valves the operative face D comes to bear always in the whole width on the lifting face A or B respectively of the control cams. The inclined faces E serve to lead smoothly the intermediate lever onto the other control cams during the reversing from forward running to backward running and inversely without the necessity to first stop the regulator or the closing pressure of the valves. With this object in view also the facing end faces of the cam elements 1a have inclined faces F, of the same angle of inclination as the faces E. During an axial shifting of the control cams the shifting of the intermediate lever from one control face onto the other is therefore effected by the wedge-effect of these faces.

Figure 9:
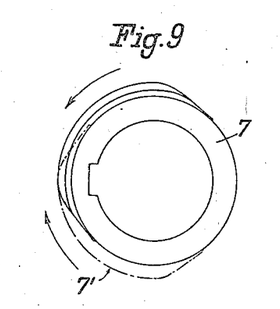
Fig. 9 shows the exhaust control cam in side elevation.
Figure 10:
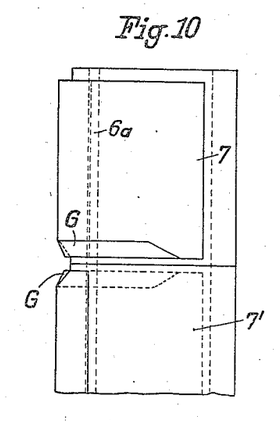
Fig. 10 shows the exhaust cam for forward running and backward running (the latter only partly) in top plan view.
Figure 11:
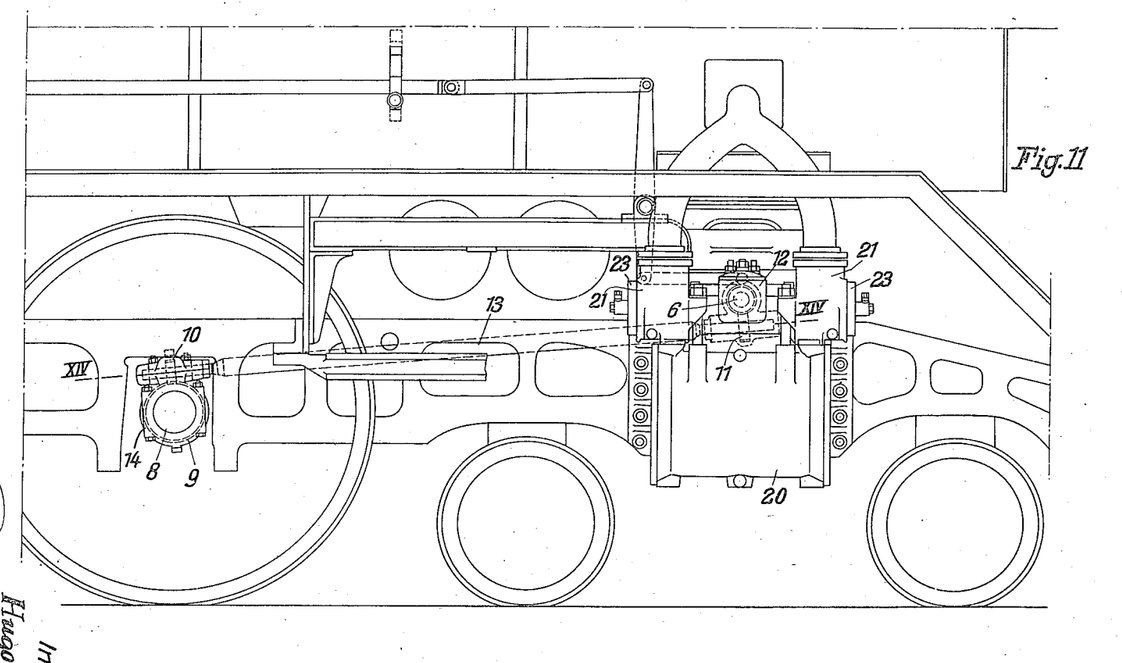
Fig. 11 shows the drive of the revolving cam shaft of a locomotive in side elevation, the cam shaft extending transversely to the frame.
Figure 12:
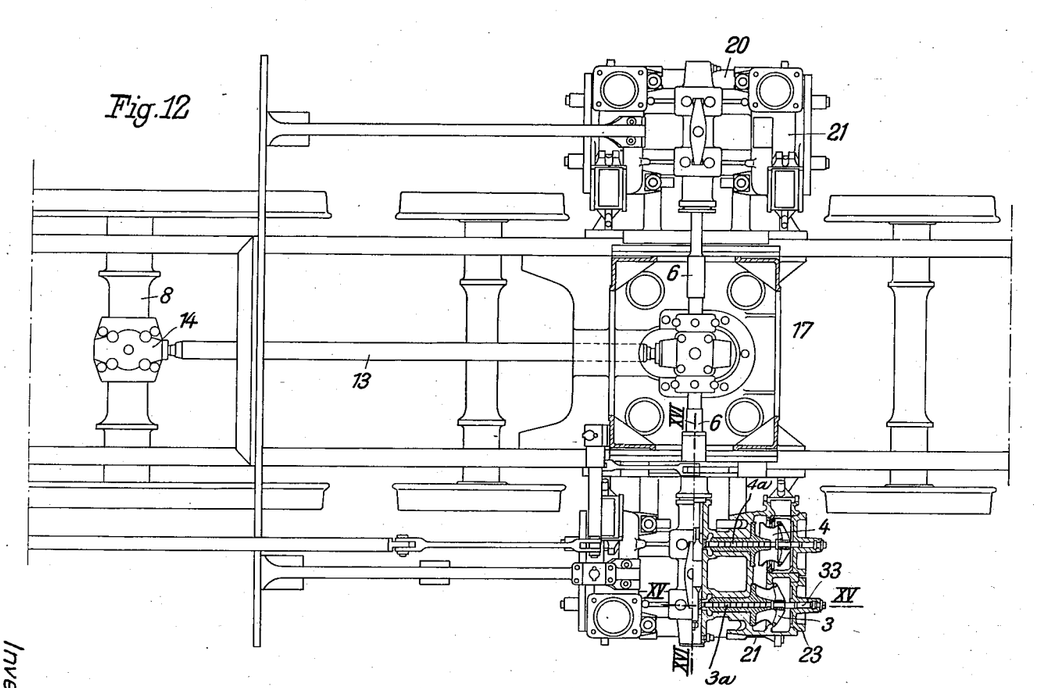
Fig. 12 is a top plan view of Fig. 11 with a section through one of the valve chests of one cylinder-half.
Figure 13:
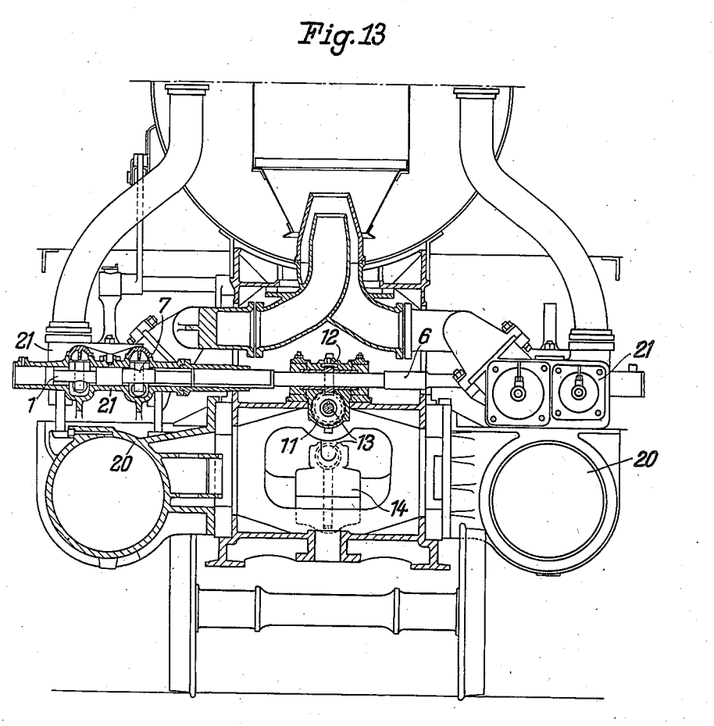
Fig. 13 is an end view of the locomotive with a part section in direction of the cam shaft.

The exhaust cam 7 (shown in Figs. 9 and 10) has the same profile for all admissions. Also on this cam the facing end faces have bevels G to guide the intermediate lever from the one cam onto the other cam during the axial displacements.

Figures 4A, 25:
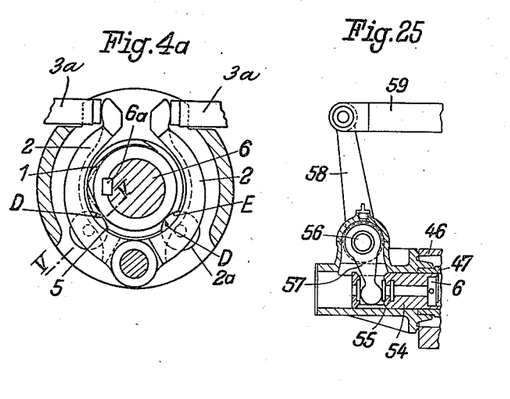
Fig. 4a is a similar view as Fig. 4 with rollers.
Fig. 25 shows a detail of the adjusting device arranged on the end of the cam shaft in section on line XXV—XXV of Fig. 24.
Figure 5A:
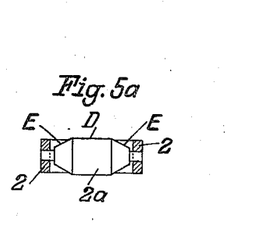

The contact between control cam and intermediate lever may however be effected by a roller 2a of suitable profile mounted in the intermediate levers, as shown in Figs. 4a and 5a.

As the greatest valve stroke at all admissions from 30% to 82% is the same and as the cams rotate at the same angular speed, the valve acceleration during the lifting is also the same for all admissions and only dependent on the number of revolutions of the axle of the locomotive. It can therefore easily be determined for all instances so that no shocks or excessive wear occur in the distribution.

The Figs. 11 to 15 show the arrangement of the above described rotating control cams on a locomotive in which the cam shaft 6 is transverse to the frame and crosses the cylinder 20 at the middle.

The driving of the cam shaft 6 is effected from a driving axle 8 by means of two pairs of worm wheels 9, 10 respectively 11, 12 and of one longitudinal shaft 13 as claimed in my Patent No. 2,158,331. The worm wheel 9 keyed on the middle of the driving axle 8 meshes with the worm wheel 10 keyed on the longitudinal shaft 13. This shaft 13 is journalled through the intermediary of a bearing body 15 in the housing 14 oscillatable around the driving axle and accommodating the worm wheels. The bearing body 15 has cylindrical lateral extensions 16 guided in corresponding recesses of the housing 14, so that the bearing body 15 can participate in any lateral oscillation of the longitudinal shaft 13. On the front end of shaft 13 the worm wheel 11 of the second pair of worm wheels is keyed and meshes with the worm wheel 12 keyed on the transverse shaft 6. These two worm wheels are located in a housing 17 adapted to oscillate about the transverse shaft 6. The longitudinal shaft 13 is also journalled in this housing 17 through the intermediary of a bearing body 18 which forms a cylindrical guide 19 together with the housing, this guide admitting of an oscillation of the shaft in lateral direction.

As the housings of the two pairs of worm wheels are arranged oscillatable about their shafts, they form Cardan joints together with the cylindrical guides 16 and 19, said joints being adapted to take up all vertical and lateral movements. To account for the alteration of the axle distance occurring at adjusting, the worm wheels are connected with the longitudinal shaft 13 by key and groove so that the worm wheel 11 can axially shift the desired distance on the shaft 13.

The two pairs of worm wheels are further dimensioned and arranged in such a manner that they move mutually in opposite directions but at the same angular speed. By this construction of the drive the prejudicial effect of the spring play is absolutely suppressed. If the longitudinal shaft 13 oscillates, a moving ahead is produced by the oscillating movement with the worm wheel 10, this moving ahead being suppressed in the same measure thereby that the rotation of worm 11 is retarded. Alterations of the position of the driving axle can therefore not exert any influence whatsoever upon the distribution.

The cam shaft 6 extends through the cam shaft chambers 5 arranged in the distribution housings 21 of the two steam cylinders, the valve spindles 3a of the admission valves 3 and the spindles 4a of the exhaust valves 4 situated parallel to the cylinder axis terminating in these cam shaft chambers 5 where they are controlled by the intermediate levers 2 influenced by the control cams. To close the valves, the other ends of the valve spindles are guided in bores 22 of the covers 23 closing the valve case 21. These bores are under steam pressure through conduits not shown, which pressure acts upon the ends of the valve spindles in the sense of closing the valves.

The adjusting of the engine to different admissions and its reversal are effected by axial shifting of the cam shaft 6 and of the control cams mounted thereon. With this object in view the shaft is shiftably mounted in the driving worm wheel 12, remaining, however, coupled with this wheel in any position by a key.

The axial adjusting of the cam shaft 6 can be effected in various manners.

Figure 16:
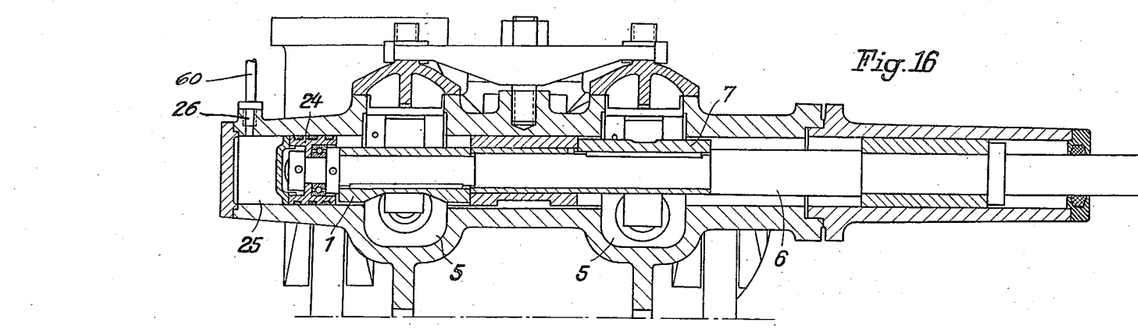
Fig. 16 is a longitudinal section in the direction of the cam shaft on line XVI—XVI of Fig. 12 on larger scale with an arrangement for adjusting the cam shaft by hydraulic pressure.

With the reversing devices shown in Fig. 16 the adjusting of the cam shaft 6 is effected by a liquid under pressure. For this purpose a piston 24 is fixed on the end of the cam shaft and guided in the cylindrical bore 25 of the cam shaft chamber 5. With the bore 25 closed by a cover plate a pipe conduit is connected at 26, through which the liquid under pressure can be introduced into the bore 25 and shift to the right the piston 20 and thereby also the control cams. A similar arrangement is made on the other end of the cam shaft, not shown in Fig. 16.

If the cam shaft has been adjusted to a certain admission, the pressure chambers 25 at both ends of the cam shaft are shut off, so that accidental adjusting of the cam shaft cannot occur. If the cam shaft 6 has to be pushed to the right, the left pressure chamber 25 (Fig. 16) is connected with the pressure conduit, whereas from the right hand pressure chamber not shown a throttled oil discharge takes place, until the desired position of the cam shaft has been attained. If the cam shaft 6 has to be shifted to the left, pressure is admitted into the right hand chamber 25 and a throttled oil discharge takes place from the left hand chamber.

The arrangement for controlling the liquid under pressure is preferably mounted on the driver's cab. It may be differently constructed.

Figure 17:
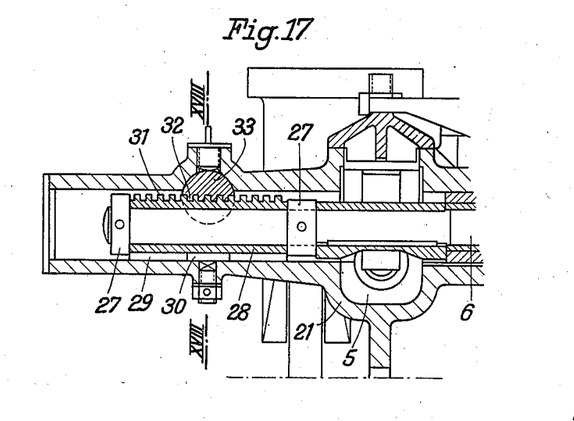
Fig. 17 shows in section an adjusting device arranged at the end of the cam shaft.

Fig. 17 shows another type of the adjusting device of the cam shaft. A bush 28 is mounted on the end of the cam shaft 6 between collars 27 and secured against rotation by a shifting key 30 engaging in a longitudinal groove 29. This bush 28 is flattened on the top side and the flattened portion has teeth 31 extending obliquely to the axis. Oblique teeth 32 of an adjusting element 33 are in mesh with the teeth 31, this element 33 intersecting the cam shaft 6 at right angles. By axial shifting of the adjusting element 33 in the one or other direction the cam shaft is also shifted to the right or left by means of the obliquely directed teeth. The teeth 31 and 32 are inclined to the direction in which the cam shaft is shifted by such an angle that self-locking occurs, i. e. the cam shaft cannot be adjusted unintentionally.

Figure 18:
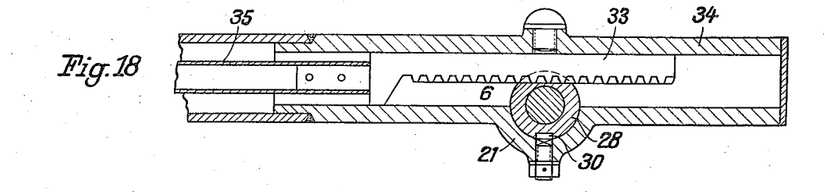
Fig. 18 is a longitudinal section on line XVIII—XVIII of Fig. 17 and shows a mechanical adjusting arrangement for the cam shaft.
Figure 19:
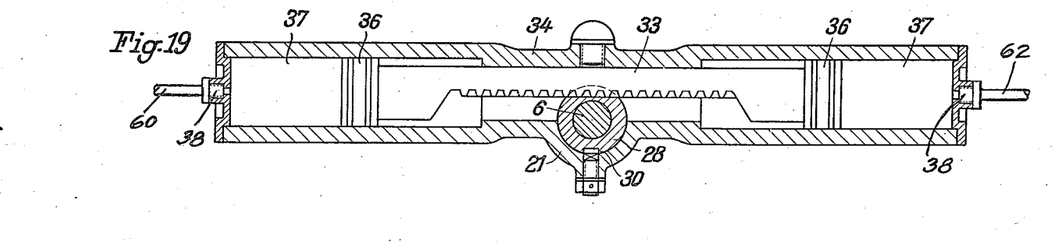
Fig. 19 shows in longitudinal section a hydraulic piston for actuating the above-mentioned mechanical adjusting arrangement.

The adjusting of the adjusting element 33, which is mounted in a cylindrical guide 34 cast on the distribution housing 21, can be effected in accordance with the form of construction shown in Fig. 18 directly by an adjusting rod 35 fixed on the same and which can be actuated from the driver's cab through the intermediary of angle levers and hinged rods. The adjusting element 33 may also be adjusted hydraulically, an arrangement suited herefor being shown in Fig. 19. According to Fig. 19 pistons 36 are fixed one at each end of the adjusting element 33 and guided in pressure cylinders 37 one at each end of the guide 34. By pressure conduits terminating at 38 in each cover plate of the pressure cylinders 37 oil under pressure can be supplied to the pressure cylinder so that the oil acts upon one of the two pistons and effects the shifting of the adjusting element 33 in the same manner as in the arrangement shown in Fig. 16.

Figure 20:
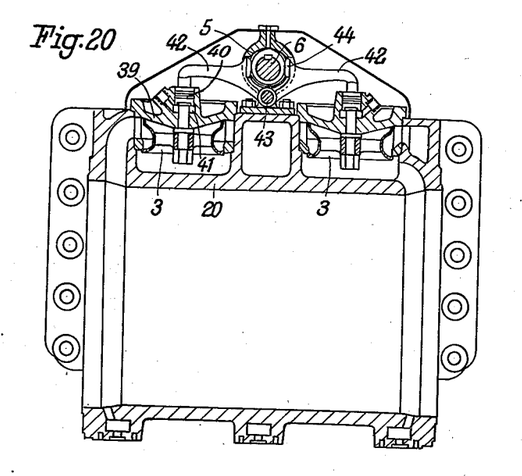
Fig. 20 shows the rotary distribution on a cylinder with suspended valve in section on line XX—XX of Fig. 21.
Figure 21:
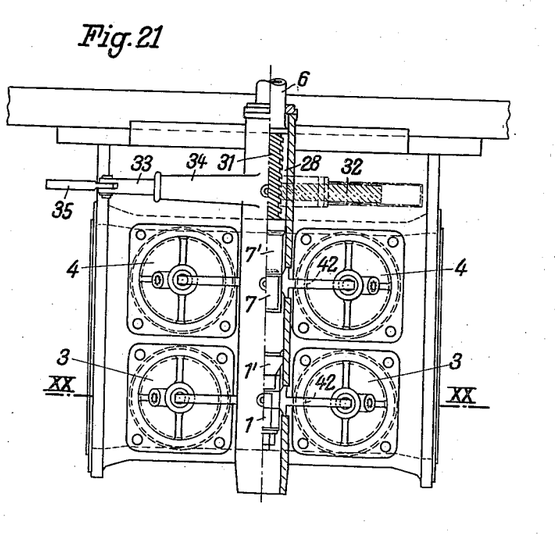
Fig. 21 is a top plan view of Fig. 20 with part section through the cam shaft chamber.
Figure 22:
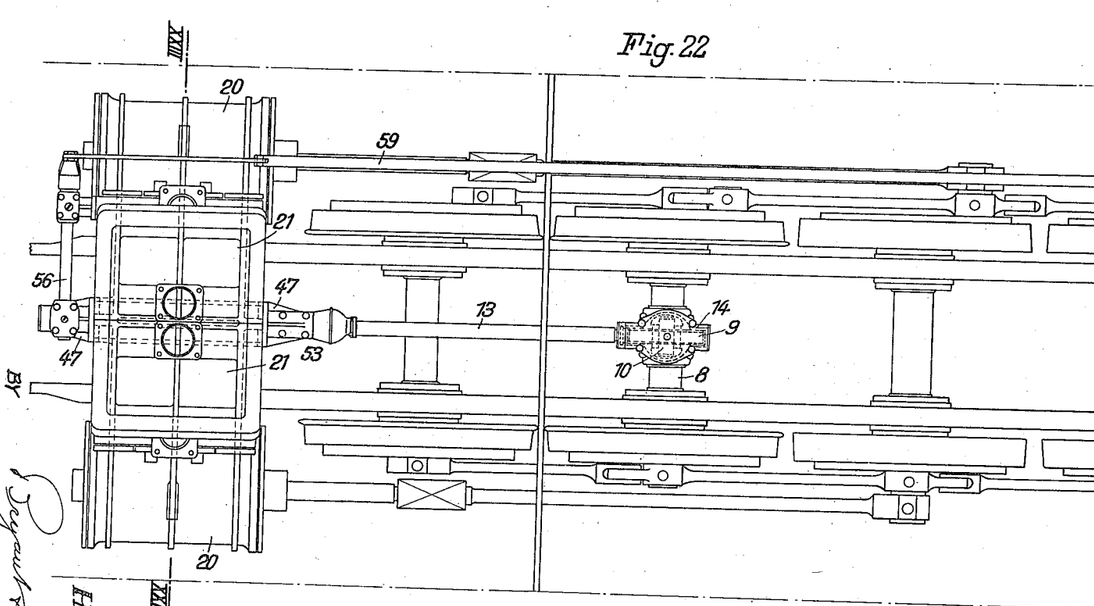
Fig. 22 shows a locomotive in top plan view in which the reversing cam shaft is arranged in the direction of travel.
Figure 23:
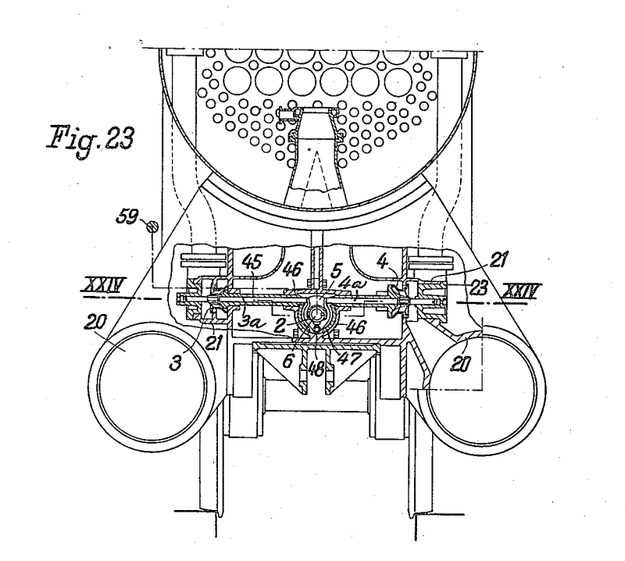
Fig. 23 is a cross section on line XXIII—XXIII of Fig. 22.
Figure 24:
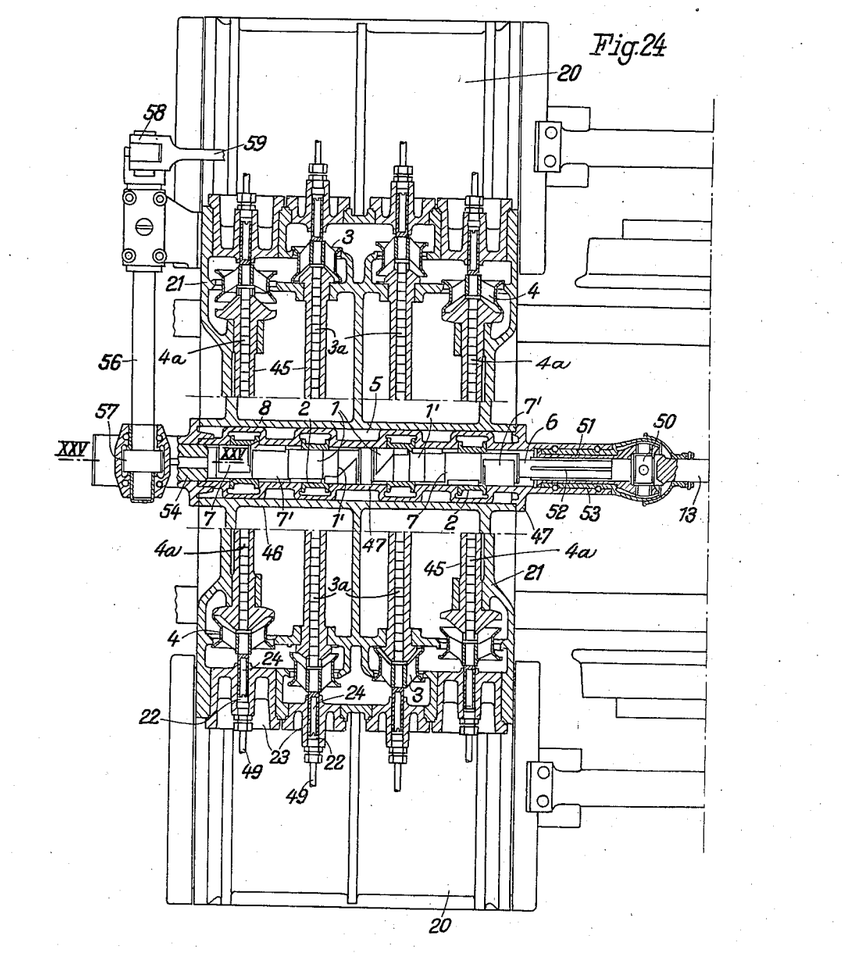
Fig. 24 is a section on line XXIV—XXIV of Fig. 23 on larger scale.

Figs. 20 and 21 show the employment of the rotating distribution for locomotive cylinder 20 in which the distribution valves 3 and 4 are suspended in the cover plates 39 covering the valve chests. The upwardly projecting ends of the valve spindles carry small pressure pistons 40 guided in a bore 41 of the cover plate. Wet steam is supplied to this bore through a pipe conduit, not shown, so that the wet steam acts upon the pistons and maintains the valves in the closing position.

The cam shaft chamber 5 is arranged between the two valve chests and transversely to the cylinder, the shaft 6 with the control cams 1 and 7 being located in this chamber. Levers 42 oscillatably arranged around an axle 43 cooperate with the control cams 1 and 7 and touch each with a domed control face 44 the control cam at two diametrically opposite points.

The free ends of the intermediate levers act upon the valve spindles and lift the valves off their seats against the closing pressure.

Also in this instance the drive of the cam shaft 6 is derived from a drive wheel axle in the manner already described. The cam shaft 6 is adjusted by an arrangement such as described with reference to Fig. 18.

Figs. 22 to 25 relate to a locomotive in which the rotating cam shaft 6 is arranged in the middle of the frame extending in the running direction. The admission valves 3 and the exhaust valves 4 are accordingly mounted in the valve chests 21 cast on the steam cylinders 20 so that all spindles 3a and 4a of the control valves of both cylinders are situated in one and the same horizontal plane transversely to the locomotive, the spindle ends being directed towards the centre and the admission valves 3 situated in each cylinder inwards and the exhaust valves 4 outwards. The spindles are guided in bushes 45 which connect the valve housing 21 with a housing 46 containing the cam shaft chamber 5. The ends of the spindles project into the cam shaft chamber 5.

In an insert bush 47 the cam shaft 6 is mounted in this chamber in the longitudinal axis of the locomotive. The admission cams 1 and the exhaust cams 7 for forward running and the admission cams 1' and the exhaust cams 7' for backward running are keyed on this shaft 6.

Arc-shaped levers 2 oscillatable around a common axle 48 cooperate with these control cams, the free ends of these levers bearing against the ends of the valve spindles. The co-operating control elements are permanently held in the contacting position by steam pressure acting upon the valve spindles. With this object in view the cover plates 23 which shut off the holes serving for the inserting of the valves into the valve housing 21 have bores 22, in which pressure pistons 24 are guided. Boiler steam is admitted to these bores by conduits 49 and presses the pistons 24 against the valve spindles, whereby the valves are closed and the control elements in the cam chamber maintained in contact. The control elements are constructed as above described.

Figure 14:
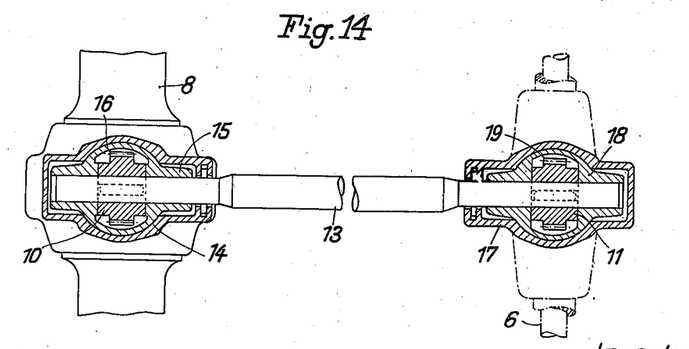
Fig. 14 shows a section through the worm wheel drive on line XIV—XIV of Fig. 11 on larger scale.
Figure 15:
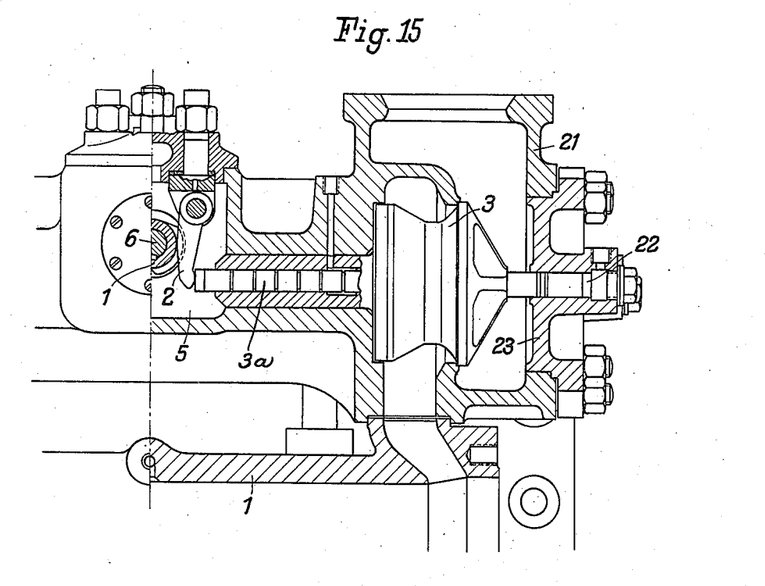
Fig. 15 is a section through one of the control valves and the cam shaft chamber on line XV—XV of Fig. 12 on larger scale.

The cam shaft is driven from a driving axle 8 of the locomotive by means of a pair of worm wheels 9 and 10, of which the wheel 10 drives a longitudinal shaft 13 which is mounted in the housing 14 as shown in Fig. 14 so that the cam can oscillate in lateral direction.

A Cardan joint 50 is mounted on the front end of the longitudinal shaft 13, the hollow front extension 51 of said Cardan joint engaging over the end of the cam shaft 6 with which it is coupled by longitudinal ribs 52 admitting of an axial shifting of the cam shaft 6 without interruption of the driving of the same. The extension 51 of the Cardan joint is mounted in a bush 53 inserted into the tubular end of the insert bush 47. In this arrangement the longitudinal shaft 13 can give way under any special movement of the axle of the locomotive. The small longitudinal shiftings of the longitudinal shaft owing to spring play of the driving axle are equalized thereby that the longitudinal shaft can shift in the upper worm wheel 10.

The reversing of the engine is effected by axial shifting of the cam shaft 6. For this purpose a two-part sliding piece 54 is mounted on the other end of the cam shaft 6 and engages over the turned off end of the cam shaft having a collar 55, so that this cam shaft can freely turn in the slide piece 54, being, however, moved in axial direction by this driving piece at a displacement of the same. The shifting of the slide piece 54 is effected by an arm 57 mounted on a transverse shaft 56 and engaging in a recess in the slide piece. The other end of the transverse shaft carries a second arm 58, adapted to be adjusted from the driver's cab by means of a rod system 59.

I claim:

1. In a poppet valve gear for piston steam engines, especially locomotive and marine engines, the combination of rotary axially shiftable admission and discharge cams, and means for axially shifting said cams, each admission cam having a running-on surface and a running-off surface, the running-on surface on its entire axial length ascending to the same height throughout with generating lines parallel to the axis of rotation, a portion of the running-off surface for the minimum, normal charge descends with generating lines parallel to the axis of rotation whereas the remaining portion for adjusting larger charges merges into a cylindrical surface descending towards the axis of rotation with an approximately helical shaped running-off surface extending from the running-off surface for setting the minimum normal charge.

2. Poppet valve gear as specified in claim 1, in which each admission cam comprises two parts, one part carrying the cam surface for setting minimum normal charges and the other the cam surface for setting larger charges.

3. A poppet valve gear as specified in claim 1, in which control cams are provided for forward and reverse running, said cams abutting one against the other and arranged to hold the valves open during reversal, spindles each carrying one of the valves, intermediate levers acting on the ends of said spindles and in cooperative arrangement with said cams having oblique faces, the abutting faces of said cams and the working surfaces on both sides of said intermediate levers also having oblique faces adapted to cooperate with the oblique faces of said cams to facilitate reversal.

4. In a poppet valve gear as specified in claim 1, the arrangement of a gear casing having a bore, an insert bush mounted in said bore, a cam shaft extending parallel to the axis of the steam cylinder and carrying the cams, said shaft slidable in said insert bush, one-armed control levers mounted on said insert bush having working surfaces cooperating with said cam shafts, and admission and exhaust valve spindles arranged side by side in the same plane, the ends of said levers bearing against the ends of said spindles.

5. In a poppet valve gear as specified in claim 1, a shaft carrying the cams, an element having oblique teeth connected with said shaft, a second element with oblique teeth shiftably mounted perpendicularly to said first mentioned element and engaging in the teeth of the first element, pistons one on each end of said second element, closed cylinders guiding each one of said pistons, said cylinders adapted to be alternately put under pressure to shift said rack-shaped element axially in the one or in the other direction.

HUGO LENTZ.